(12) United States Patent
Ettorre et al.

(10) Patent No.: US 7,471,754 B2
(45) Date of Patent: Dec. 30, 2008

(54) METHOD AND DEVICE FOR FINE SYNCHRONIZATION OF A DIGITAL TELECOMMUNICATION RECEIVER

(75) Inventors: Donato Ettorre, Turin (IT); Maurizio Graziano, Turin (IT); Bruno Melis, Turin (IT); Andrea Finotello, Turin (IT); Alfredo Ruscitto, Turin (IT)

(73) Assignees: Telecom Italia S.p.A., Milan (IT); STMicroelectronics S.R.L., Agrate Brianza (IT)

( * ) Notice: Subject to any disclaimer, the term of this patent is extended or adjusted under 35 U.S.C. 154(b) by 610 days.

(21) Appl. No.: 10/534,993

(22) PCT Filed: Nov. 15, 2002

(86) PCT No.: PCT/EP02/12813

§ 371 (c)(1),
(2), (4) Date: Oct. 20, 2005

(87) PCT Pub. No.: WO2004/047326

PCT Pub. Date: Jun. 3, 2004

(65) Prior Publication Data

US 2006/0133460 A1    Jun. 22, 2006

(51) Int. Cl.
*H04L 7/00* (2006.01)
(52) U.S. Cl. .................. 375/355; 375/136; 375/137; 375/145; 375/147; 375/149; 375/364
(58) Field of Classification Search ............ 375/136, 375/137, 145, 147, 149, 355, 364
See application file for complete search history.

(56) References Cited

U.S. PATENT DOCUMENTS 5,493,588 A    2/1996   Lennen (Continued)

FOREIGN PATENT DOCUMENTS

EP    0 880 238    11/1996

(Continued)

OTHER PUBLICATIONS

"Interpolation in Digital Modems—Part I" (IEEE Trans Comm. Mar. 1993).

(Continued)

*Primary Examiner*—Curtis B Odom
(74) *Attorney, Agent, or Firm*—Andrew Wilford

(57) ABSTRACT

A method for the synchronization of a digital telecommunication receiver comprises the steps of:—storing a plurality of consecutive samples E−1, E, M, L, L+1 of an incoming spread spectrum signal in a delay line 56;—determining by interpolation between consecutive samples of the incoming spread spectrum signal, by means of a first digitally controlled interpolator 26, an interpolated early sample (e) anticipating an optimal sampling time instant;—determining by interpolation between consecutive samples of the incoming spread spectrum signal, by means of a second digitally controlled interpolator 24, an interpolated middle sample (m) corresponding to the optimal sampling time instant;—determining by interpolation between consecutive samples of the incoming spread spectrum signal, by means of a third digitally controlled interpolator 28, an interpolated late sample (l) delayed with respect to the optimal sampling time instant;—calculating an error signal $\xi$ as the difference between the energy of the symbols computed from the interpolated early sample (e) and the interpolated late (l) sample;—extracting the sign of the error signal $\xi$—accumulating the sign of the error signal $\xi$ for the generation of control signals $S_E$, $S_M$, $S_L$ for controlling the interpolation phases of the digitally controlled interpolators used for determining the interpolated early (e), middle (m) and late (l) samples. The accumulated value has a positive saturation value of +4 and a negative saturation value of 4.

21 Claims, 7 Drawing Sheets

U.S. PATENT DOCUMENTS

| | | |
|---|---|---|
| 5,781,152 A | 7/1998 | Renard et al. |
| 6,201,828 B1 | 3/2001 | El-Tarhuni et al. |
| 7,206,335 B2 * | 4/2007 | Bultan et al. ................ 375/148 |
| 2004/0029609 A1 * | 2/2004 | Li ........................... 455/550.1 |

FOREIGN PATENT DOCUMENTS

| | | |
|---|---|---|
| EP | 0 932 263 | 7/1999 |

OTHER PUBLICATIONS

"Interpolation in Digital Modems—Part II" by Erup et al. (same date).

"A Digital Chip Timing Recovery Loop . . ."by De Gausenzi et al. (IEEE Trans. Nov. 1993.

* cited by examiner

| SEL | Timing offset ($\tau$) | $y_{OUT} = f(y_E, y_M, y_L, SEL)$ |
|---|---|---|
| 4 | $-\dfrac{T_c}{2}$ | $y_{OUT} = y_E$ |
| 3 | $-\dfrac{3 \cdot T_c}{8}$ | $y_{OUT} = \dfrac{y_M + 3 \cdot y_E}{4}$ |
| 2 | $-\dfrac{T_c}{4}$ | $y_{OUT} = \dfrac{y_M + y_E}{2}$ |
| 1 | $-\dfrac{T_c}{8}$ | $y_{OUT} = \dfrac{3 \cdot y_M + y_E}{4}$ |
| 0 | 0 | $y_{OUT} = y_M$ |
| -1 | $\dfrac{T_c}{8}$ | $y_{OUT} = \dfrac{y_L + 3 \cdot y_M}{4}$ |
| -2 | $\dfrac{T_c}{4}$ | $y_{OUT} = \dfrac{y_L + y_M}{2}$ |
| -3 | $\dfrac{3 \cdot T_c}{8}$ | $y_{OUT} = \dfrac{3 \cdot y_L + y_M}{4}$ |
| -4 | $\dfrac{T_c}{2}$ | $y_{OUT} = y_L$ |

Fig. 13

| SEL | Timing offset ($\tau$) | $y_{OUT} = f(y_E, y_M, y_L, SEL)$ |
|---|---|---|
| 2 | $-\dfrac{T_c}{2}$ | $y_{OUT} = y_E$ |
| 1 | $-\dfrac{T_c}{4}$ | $y_{OUT} = \dfrac{y_M + y_E}{2}$ |
| 0 | 0 | $y_{OUT} = y_M$ |
| -1 | $\dfrac{T_c}{4}$ | $y_{OUT} = \dfrac{y_L + y_M}{2}$ |
| -2 | $\dfrac{T_c}{2}$ | $y_{OUT} = y_L$ |

Fig. 14

| Timing offset ($\tau$) | $S_B$ | $S_M$ | $S_L$ |
|---|---|---|---|
| $-T_C/2$ | 2 | 4 | 2 |
| $-3 \cdot T_C/8$ | 1 | 3 | 2 |
| $-T_C/4$ | 1 | 2 | 1 |
| $-T_C/8$ | 0 | 1 | 1 |
| 0 | 0 | 0 | 0 |
| $+T_C/8$ | -1 | -1 | 0 |
| $+T_C/4$ | -1 | -2 | -1 |
| $+3 \cdot T_C/8$ | -2 | -3 | -1 |
| $+T_C/2$ | -2 | -4 | -2 |

METHOD AND DEVICE FOR FINE SYNCHRONIZATION OF A DIGITAL TELECOMMUNICATION RECEIVER

CROSS REFERENCE TO RELATED APPLICATIONS

This application is the US national phase of PCT application PCT/EP2002/012813 filed 15 Nov. 2002 with a claim to the priority of PCT patent application PCT/EP2002/012813 itself filed 15 Nov. 2002.

FIELD OF THE INVENTION

The present invention refers to telecommunication systems and in particular to a method for fine synchronization of a digital telecommunication receiver. The invention also relates to a digital receiver for use in a CDMA (Code Division Multiple Access) system.

The CDMA access technique currently finds widespread use in third generation mobile communication systems (e.g. UMTS, CDMA2000) thanks to its higher spectrum efficiency with respect to other access techniques.

In a CDMA system the data sequence is spread by a pseudo noise code (hereinafter "PN code") having a broader spectrum width. The efficiency of these systems is highly dependent on the capability of the receiver to continuously maintain precise phase synchronization between the received and the locally generated PN code.

In fact, without a precise phase synchronization between the received and the locally generated code, the performance loss of the receiver is in the order of several dB even for a mismatch of half of the chip period.

The phase synchronisation process is usually accomplished in two steps: code acquisition and code tracking. Code acquisition is the initial search process that brings the phase of the locally generated code to within the chip duration ($T_C=1/F_C$) of the incoming code. Code tracking is the process of achieving and maintaining fine alignment of the chip boundaries between the incoming and locally generated codes.

In particular, the present invention is concerned with the code tracking part of the receiving apparatus, which is generally implemented in the form of a Rake receiver.

For a digital receiver a key component is the analog-to-digital converter (ADC). In several applications the sampling clock rate cannot in any case be synchronized with the incoming signal. For example, one of these applications is a CDMA base station receiver where the sum of several signal, non-synchronous among each other, are received and digitised with a single analog-to-digital converter. In these cases, the fine timing sync ion (i.e. the code tracking) between the received and locally generated PN code of each user must be achieved through digital methods, as it is not possible to modify the sampling clock phase.

BACKGROUND ART

The code tracking operations are performed by a Synchronisation Unit. Several types of code tracking loops have been extensively applied in practical applications and the most popular solution is the so-called Early-Late synchronizer.

The Synchronisation Unit receives, as input, the baseband signal y(t) from the receiver front-end, oversampled at the frequency $f_s=N \cdot F_C$ and with at least two samples per chip ($N \geq 2$), and feeds a finger of the Rake receiver with one sample per chip (i.e. the optimal sample), as shown in FIG. 1. Each finger of the Rake receiver requires its own Synchronisation Unit because the values of timing offset of the different multi-path components demodulated by the different fingers of the Rake receiver are usually not the same.

The fine timing synchronisation can be achieved by performing some kind of interpolation among the received samples, in order to get the exact value or, at least, to approximate the received signal in correspondence of the optimal sampling instants $t_{opt}$. This technique is well known and is disclosed for example in F. M. Gardner, "Interpolation in digital modems—Part I: Fundamentals". IEEE Trans. Communications, vol. 41, pp. 502-508, March 1993 or in L. Erup, F. M. Gardner, "Interpolation in digital modems—Part II. Implementation and Performance".

The optimal sampling instant $t_{opt}(t)$ varies with time due time variant nature of the wireless channel and corresponds to the instant in which the amplitude of the received signal is maximal and, simultaneously, the Inter-Symbol Interference (ISI) is minimal. By sampling the received signal in correspondence of the optimal sampling time, it is possible to se the Signal to Noise Ratio (SNR) and therefore minimise the Bit Error Rate (BER) at the output of the receiver. The optimal sampling time can be observed in the eye diagram as the point of maximum opening, as shown in FIG. 2.

In the following it is described the principle of a Synchronisation Unit based on the known art. The description is based on the case of a real signal y(t), but the extension to a complex signal y(t) is straightforward.

The block diagram of a Synchronisation Unit 1, described in the prior art is shown in FIG. 3. The considered scheme operates with a feedback loop. A time continuous signal y(t) is received at the input of the Analog to Digital Converter 2. The signal y(t) is a sequence of pulses with period $T_C$ and shaped, for example, by a couple of root raised cosine (RRC) filters $$y(t) = \sum_{k=0}^{\infty} u_k \cdot h(t - k \cdot T_C)$$

where $u_k=\{-1,+1\}$ is the sequence of transmitted chips and h(t) is the impulse response of the equivalent Raised Cosine (RC) filter with the following expression $$h(t) = \frac{\sin\left(\frac{\pi \cdot t}{T_C}\right)}{\frac{\pi \cdot t}{T_C}} \cdot \frac{\cos\left(\alpha \cdot \frac{\pi \cdot t}{T_C}\right)}{1 - \left(2 \cdot \alpha \cdot \frac{t}{T_C}\right)^2}$$

The unilateral bandwidth of the signal y(t) is equal to $$B = \frac{(1+\alpha)}{2 \cdot T_C}$$

where α is the roll-off of the RRC shaping filters.

The ADC converter 2 takes samples of y(t) at uniform intervals $t_s$, which correspond to an ADC sampling frequency of $f_s=1/t_s$. The sampling of the analog baseband signal can be performed with different sampling rates. However, the Nyquist criterion requires a minimum ADC sampling rate of two times the unilateral signal bandwidth, namely $f_s \geq 2 \cdot B$.

The signal samples $y(n \cdot t_s) = y(n)$ at the output of the ADC converter 2 are provided to the interpolator 4 that computes the interpolated values $y_I(m \cdot t_I) = y_I(m)$ at intervals $t_I$. The goal of the interpolator is to increase the time resolution after the ADC conversion, so that the time spacing $t_I$ of the samples at the output of the interpolator is smaller that the time spacing $t_s$ of the samples at the output of the ADC. In general we have $$\frac{t_s}{t_I} = K$$

where K is an integer number greater than one.

Being the samples y(n) at the output of the ADC not taken in correspondence of the optimal time instant, the Synchronisation Unit must first estimate the optimal sampling instant $\hat{t}_{opt}$ and then compute or approximate the value of y(t) in correspondence of that instant. The value $y(\hat{t}_{opt})$ is then provided at the output of the Synchronisation Unit for the subsequent signal processing.

The principle of timing synchronisation through digital interpolation is shown in FIG. 4 for a case of linear interpolation with K=4.

In the example of FIG. 4 the signal y(t) in correspondence of the optimal sampling instant $t_{opt}$ is approximated with the interpolated value $y_I(m+3)$.

The interpolated value $y_I(m+3)$ is calculated as follows: first it is computed the middle point $y_I(m+2)$ between two consecutive samples y(n) and y(n+1) at the output of the ADC $$y_I(m+2) = \frac{y(n) + y(n+1)}{2}$$

Similarly, the other two interpolated values $y_I(m+1)$ and $y_I(m+3)$ are computed as the average between one ADC sample and the interpolated value $y_I(m+2)$ calculated in the previous step $$y_I(m+1) = \frac{y(n) + y_I(m+2)}{2} = \frac{3 \cdot y(n) + y(n+1)}{4}$$

$$y_I(m+3) = \frac{y_I(m+2) + y(n+1)}{2} = \frac{y(n) + 3 \cdot y(n+1)}{4}$$

Of course, by using a more complex interpolation scheme (e.g. parabolic, cubic) or increasing the resolution of the interpolator (i.e. increasing K) it is possible to make more precise the estimate of the received signal in correspondence of the optimal sampling instant.

The synchronization unit of FIG. 3 also includes other elements that are essential for the synchronization process. A data filter 5 processes the interpolated samples and selects the optimal sample for the subsequent signal processing. The data filter is indicated within the feedback loop, but it can also be placed outside of the loop. Post-placement may be advantageous in terms of complexity when the data filter is more complicate than the interpolator and a relatively high sampling rate is employed for interpolation.

The optimal sampling instant $t_{opt}$ is estimated by a timing error detector block 6 and filtered by a loop filter 7. The goal of the loop filter is to reject the effect of noise that may affect the optimal sampling time estimate. Finally, the loop filter output drives a controller 3, which provides the control signal to the interpolator 4.

Starting from the general structure of a Synchronisation Unit, shown in FIG. 3, it is possible to analyse its application in the particular case of a digital CDMA receiver.

A known solution for performing the code tracking operations in a CDMA receiver is the so-called Early-Late synchronizer disclosed for example in John G. Proakis, *"Digital Communications"*, $3^{nd}$ edition, Mc Graw-Hill, New York, 1995.

The joint application of the interpolation and the Early-Late concept for the synchronisation of a CDMA receiver can be found in R. De Gaudenzi M. Luise, *"A Digital Chip Timing Recovery Loop for Band-Limited Direct-Sequence Spread-Spectrum Signals"*. IEEE Trans. On Communications, vol. 41, No. 11, November 1993.

An Early-Late synchronizer exploits the symmetry properties of the signal autocorrelation at the output of the receiver-matched filter.

In the following we suppose that the signal at the input of the Early-Late synchronizer is sampled with two samples per chip (N=2). Two subsequent samples at the input of the Early-Late synchronizer are then separated in time by $T_C/2$ (with $T_C = 1/F_C$ = chip period).

In order to introduce a suitable mathematical notation for sequences with different rates, we denote with k the discrete time index related to the chip period so that $e(k) = e(k \cdot T_C)$. We also denote with SF the spreading factor. The period of the information symbols before the spreading process is equal to $T_S = SF \cdot T_C$ and the discrete time index related to this symbol period is equal to (k div SF), where A div B is the integer part of the quotient between A and B.

Each received chip can be characterised by an early, a middle and a late samples defined as follows:

early sample: is the sample that anticipates the optimal sampling time instant. The early sample is denoted with $e_I(k)$ and $e_Q(k)$ for the in-phase and in-quadrature component respectively;

middle sample: is the sample that, in the absence of timing errors, corresponds to the optimal sample or equivalently to the peak of the received impulse h(t). The middle sample is denoted with $m_I(k)$ and $m_Q(k)$ for the in-phase and in-quadrature component respectively;

late sample: is the sample that is delayed with respect to the optimal sampling time instant. The late sample is denoted with $l_I(k)$ and $l_Q(k)$ for the in-phase and in-quadrature component respectively. The late sample of a given chip is also the early sample of the next chip.

The definition of early, middle and late samples is clarified in FIG. 5 for the in-phase component and in the case of perfect timing synchronisation. From FIG. 5 it is possible to notice that the middle sample is the one with the higher energy and minimum ISI. Consequently, it has to be provided to the Rake finger for the descrambling and despreading operations.

Moreover, from FIG. 5 it is possible to observe that, if the impulse response of the complete system is symmetrical and the system has achieved a perfect timing synchronisation, then the energies of the early and late samples are identical.

The two conditions of perfect timing synchronisation can be expressed as follows:

Perfect timing synchronisation $\Rightarrow \epsilon_m = m_I^2(k) + m_Q^2(k)$
= maximum Perfect timing synchronisation $\Rightarrow \epsilon_e = e_I^2(k) + e_Q^2$
$(k) = \epsilon_l = l_I^2(k) + l_Q^2(k)$ where $\epsilon_e$, $\epsilon_m$, $\epsilon_l$ are the energies of the early, middle and late samples respectively.

In the presence of noise the identification of the sample with maximum energy is usually difficult. Instead of sampling the signal in correspondence of the peak, the Early-Late synchronizer identifies the optimal sampling instant through the second condition: the energy of the early and late samples has to be equal or, in other words, the difference between the two energies must be reduced to zero ($\epsilon_e - \epsilon_l = 0$). When such condition is fulfilled the sample between early and late (i.e. the middle) is the optimal sample to be provided to the Rake finger.

Taking into account that in a CDMA system the signal to noise ratio on the channel is very low, the condition $\epsilon_e - \epsilon_l = 0$ must be verified on the symbols after the operations of despreading and integration. Averaging over SF samples leads to mean values of the early and late sample energies and reduces the energy fluctuations due to noise and interference from other users.

A simplified block diagram of a prior art Early-Late synchronizer is shown in FIG. 6 for the general case of a real PN (Pseudo Noise) code $c_c(k)$. However, the same scheme is valid in case of complex PN code by simply replacing each couple of real multiplication units with one complex multiplication unit.

The Early-Late synchronizer of FIG. 6 uses two correlators: the first performs the despreading and integrate and dump operations on the early samples while the second correlator performs the same operations on the late samples. The outputs of the two correlators are then squared in order to get the energy of the despreaded symbols, to remove the modulation of the data sequence and the phase rotation introduced by the propagation channel. Finally, an error signal $\xi$ is computed by taking the difference of the two-correlator outputs.

After the operations of despreading, integration, squaring and sum of the in-phase and in-quadrature components the error signal, for a certain timing error $\tau = t - t_{opt}$, is given by $\xi(k \text{ div } SF) = E(k \text{ div } SF) - L(k \text{ div } SF)$ The characteristic of the Early-late synchronizer in terms of error signal $\xi$ as a function of the timing error $\tau$ is shown in FIG. 7. The Early-Late characteristic, due to its particular shape, is usually referred to as S-curve.

From FIG. 7 we observe that when a timing offset is present ($\tau \neq 0$), the error signal $\xi$ at the output of the Early-Late synchronizer is nonzero and the time position of the early, middle and late samples must be delayed or advanced (depending on the sign of the error) to get the optimal sampling instant.

An alternative solution for finely adjusting the time position of the early, middle and late samples, without delaying or advancing their positions, consists in using three digital interpolators as shown, in the particular case of a timing offset $\tau = T_C/4$, in FIGS. 8 and 9.

Two of these interpolators are used to compute the early E and the late L samples while the third interpolator is used to compute the middle M sample (i.e. die optimal sample with the maximum energy). The early and late samples are provided to the correlators for the computation of the error signal $\xi$, while the middle sample is provided to the Rake finger for the subsequent signal processing (descrambling, despreading, channel estimation and compensation, decoding, etc.).

If we consider in FIG. 8 the early E, the middle M and the late L samples, we observe that, by means of a linear interpolator, it is possible to generate, with a certain resolution, all the samples between two subsequent values early E and middle M or middle M and late L. In the case of error signal larger than zero the optimal sampling time is delayed with respect to the middle M sample and therefore the value of the optimal sample can be computed with a linear interpolation between the middle M and the late L samples. In a similar way for an error signal lower than zero, the optimal sample is computed by means of a linear interpolation between the early E and the middle M samples.

In order to compute the delayed or advanced version of the samples early E and late L, determining the error signal, it can be necessary to interpolate the early E sample between the previous sample E−1 and the middle M sample and, in similar way, the late L sample between the subsequent sample L+1 and the middle M sample, as it is possible to observe in FIG. 9. Therefore a Synchronisation Unit based on the Early-Late synchronizer requires the knowledge of five subsequent samples E−1, E, M, L, L+1 of the incoming signal spaced of $T_C/2$ among each other.

The three interpolators are used to finely adjust the time position of the early, late and middle samples feeding the correlators and the Rake finger respectively. These interpolators are controlled by a digital signal derived from the error signal $\xi$ of the Early-Late synchronizer. If the loop is coyly designed so to obtain a negative feedback, the system automatically minimizes the error signal by converging towards the error zero condition. The minimum error condition is equivalent to say that the middle sample is the one with the maximum energy and therefore the optimal one.

The time position of the three interpolated samples (early, middle and late) is moved backward or forward by a time factor $\delta$ when the error signal is respectively positive or negative. The factor $\delta$ represents the time resolution of the interpolators and it is usually equal to $T_C/8$.

The interpolation of the middle sample with a time resolution of $\delta = T_C/8$ is usually sufficient to get a negligible degradation of the system performance with respect to an ideal interpolator having infinite resolution. An interpolator having a resolution of $T_C/8$ is however a rather complex circuit, affecting negatively the silicon area requirements on the chip.

The early and the late samples feed the correlators that compute the error signal $\xi$. The time distance $\Delta$ between the early and the late samples is defined as early-late spacing. The classical implementations of the Early-Late synchronizer employ a fixed early-late spacing, usually equal to the chip period $T_C$.

The Applicant has tackled the problem of reducing the overall complexity and silicon requirement of a synchronization unit in a digital receiver for use in a CDMA system.

The Applicant observes that, in a digital receiver, an interpolator having a resolution of $\delta = T_C/8$ is a rather complex circuit, mostly due to the fact that the mathematical operations required to perform a linear interpolation with resolution $\delta = T_C/8$ are complex operations, i.e. sums, divisions by two and multiplications by a constant factor equal to 3. The complexity of the single interpolator affects negatively the chip area, especially in case of a base station receiver where many of these interpolators are required to process the signals of the various users.

In fact, each Rake finger of a digital receiver needs six interpolators: early, middle and late for both signal components (I and Q). Moreover if we consider, as a possible example, a UMTS base station with 64 different Rake receiver, each with $N_f = 8$ fingers, it is then evident from these numbers that employing interpolators having reduced complexity is a remarkable advantage.

In view of the above, it is an object of the invention to provide a method and a device for fine synchronization of a digital receiver having reduced complexity. Thanks to the reduced complexity, it is possible to reduce the area of the silicon chip in which the system is integrated.

The above and other objects are reached by the method and the device realised according to the invention, as claimed in the accompanying claims.

SUMMARY OF THE INVENTION

The Applicant has found that, using a variable time distance between the early and late samples, it is possible to remarkably simplify the architecture of the corresponding interpolators. To this end, the interpolation structure of the device provides for a variable early-late spacing, as a function of timing error τ.

The method and the device according to the invention allow simplifying the interpolators of the early and late samples of each rake finger, therefore reducing the complexity of the whole system.

BRIEF DESCRIPTION OF THE DRAWINGS

FIG. 13 and FIG. 14 are tables illustrating the mathematical operations required to perform a linear interpolation according to the invention;

DESCRIPTION OF PREFERRED EMBODIMENTS

A device according to the present invention will now be described in detail with reference to the UMTS (Universal Mobile Telecommunications System) systems, in the particular case of a UMTS receiver operating in the FDD mode (Frequency Division Duplex).

Figure 1:
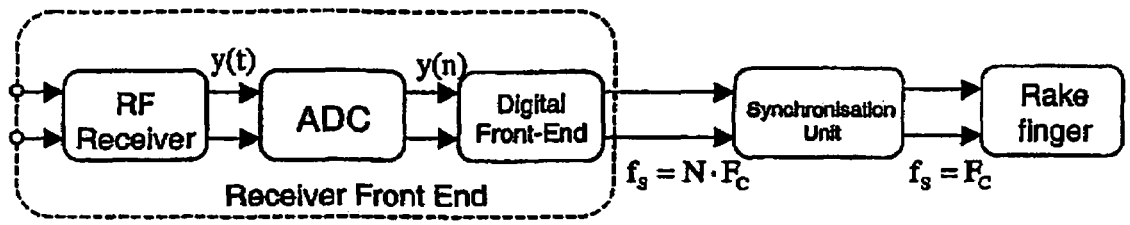
FIG. 1 is a block diagram of a prior art module of a Rake Receiver.
Figure 2:
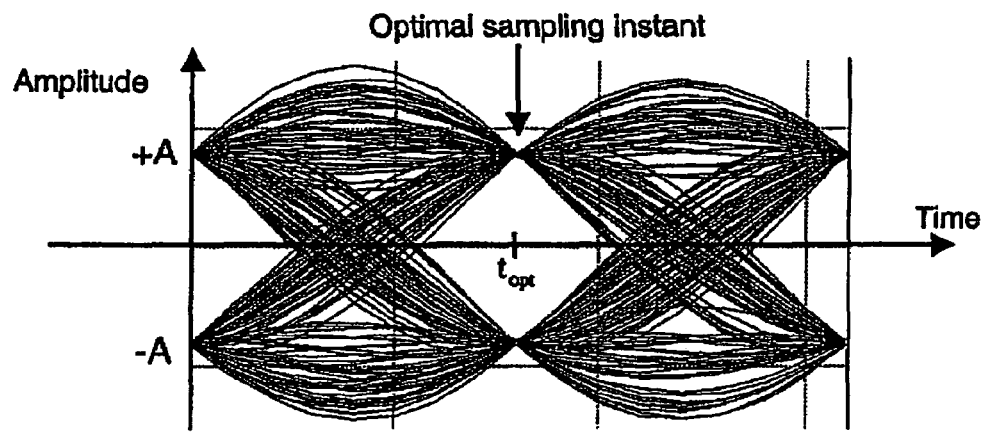
FIG. 2 is an example of an eye diagram showing an optimal sampling time instant.
Figure 3:
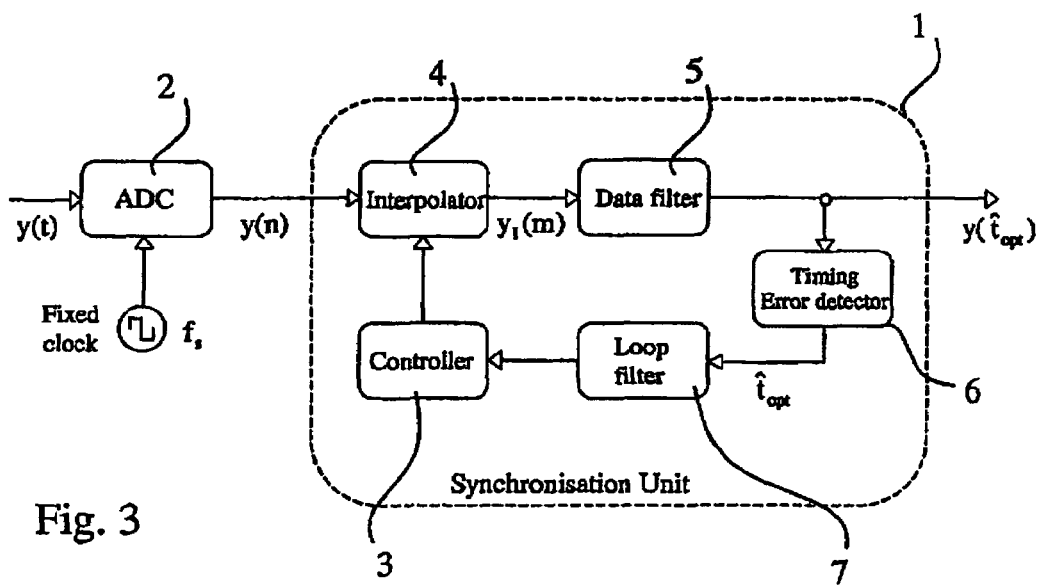
FIG. 3 is a block diagram of a prior art synchronization unit.
Figure 4:
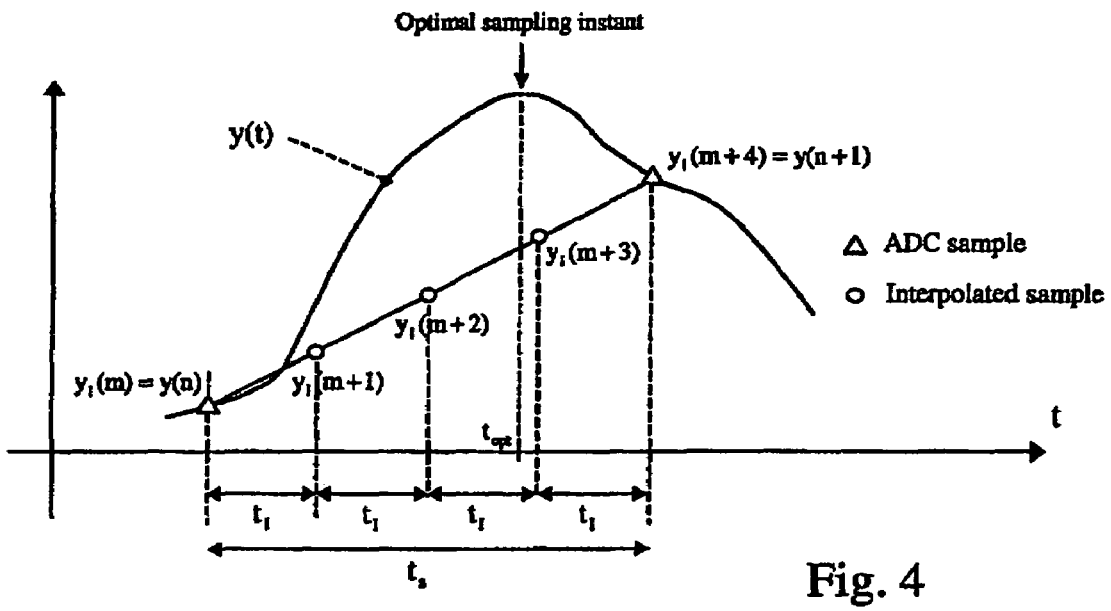
FIG. 4 is a graph showing timing synchronization by means of signal interpolation.
Figure 5:
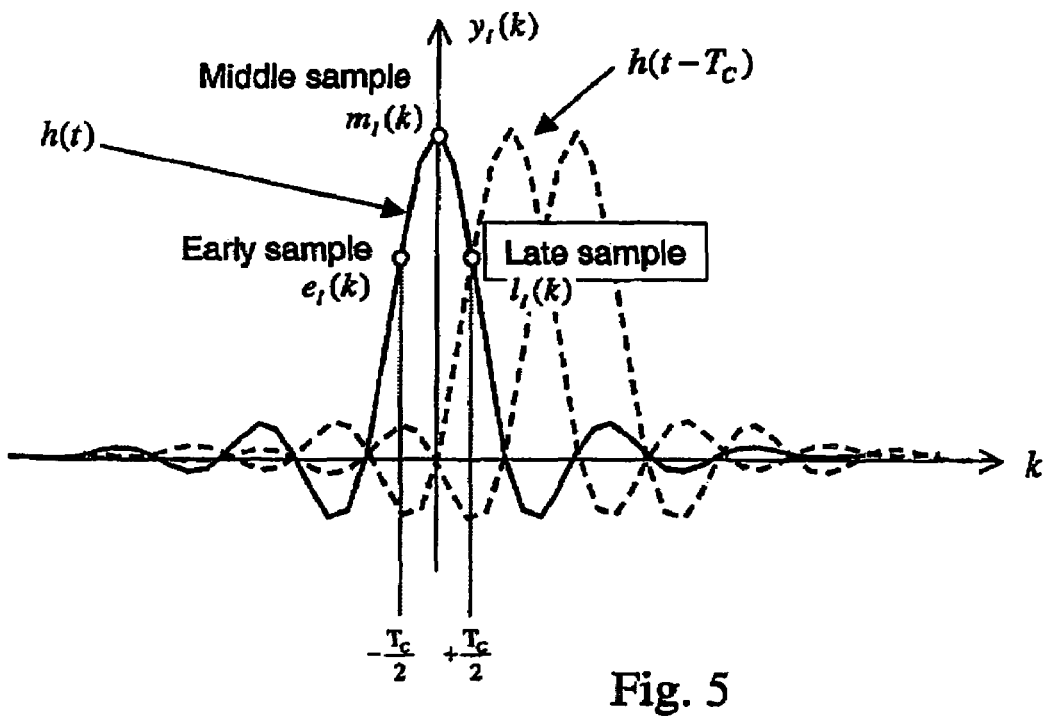
FIG. 5 is a graph showing early, middle and late samples on a received signal.
Figure 6:
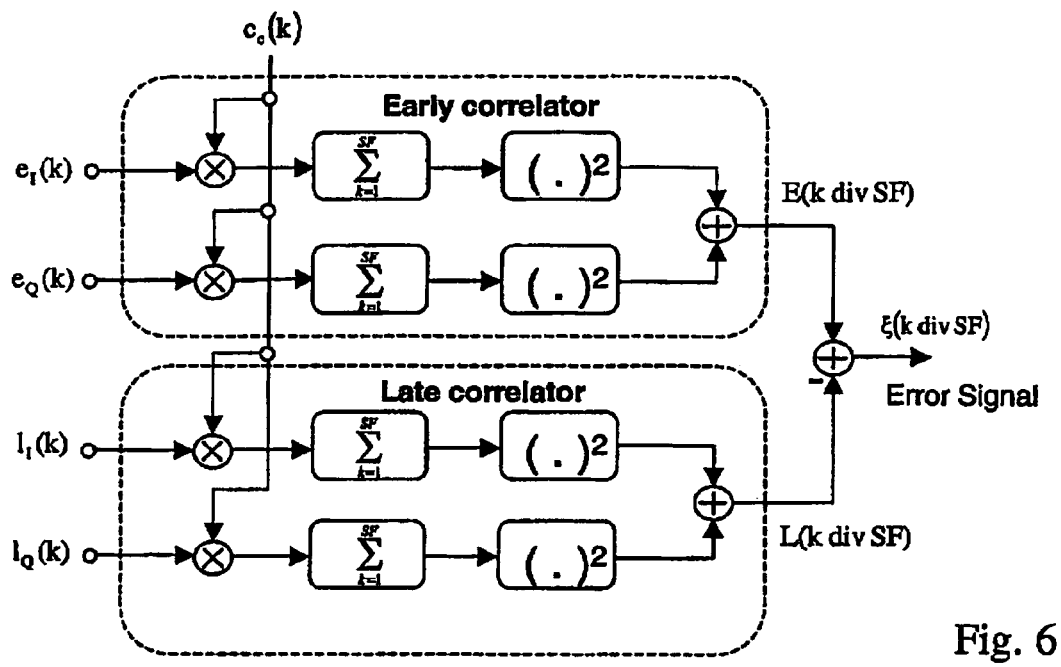
FIG. 6 is a simplified block diagram of an Early-Late synchronizer.
Figure 7:
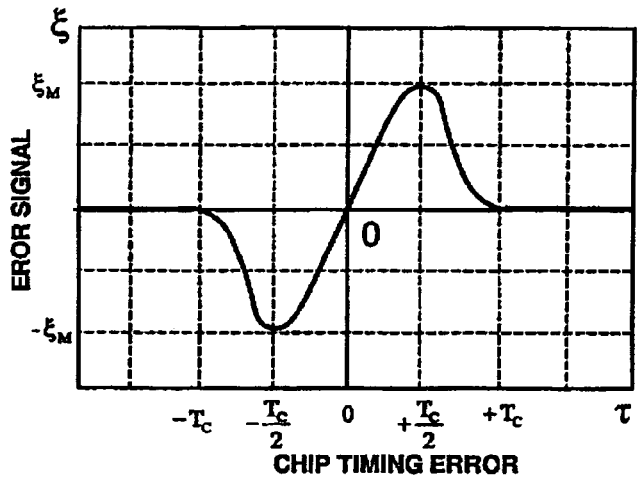
FIG. 7 is a graph of en error signal in an Early-Late synchronizer.
Figure 8:
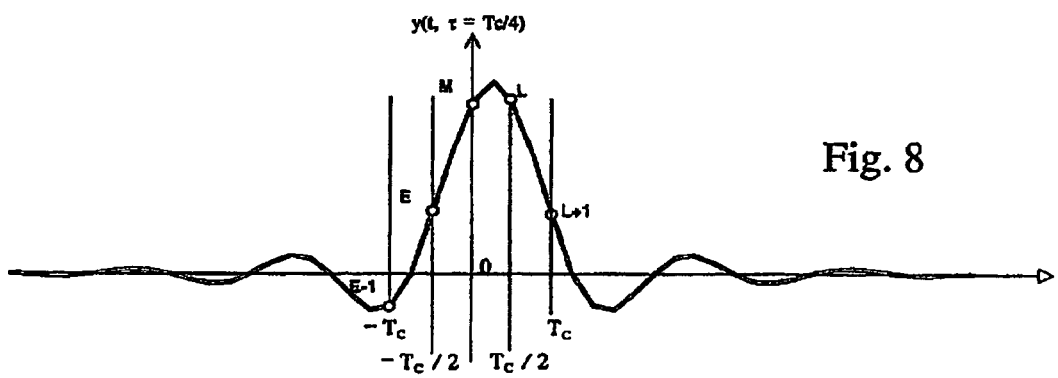
FIGS. 8 and 9 show a known principle of digital Early-Late synchronizer exploiting the interpolation.
Figure 9:
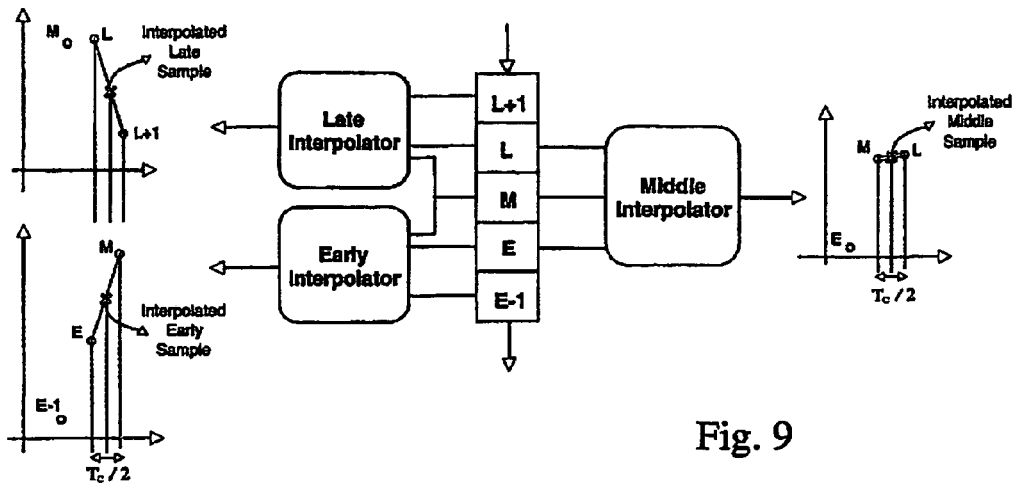
Figure 10:
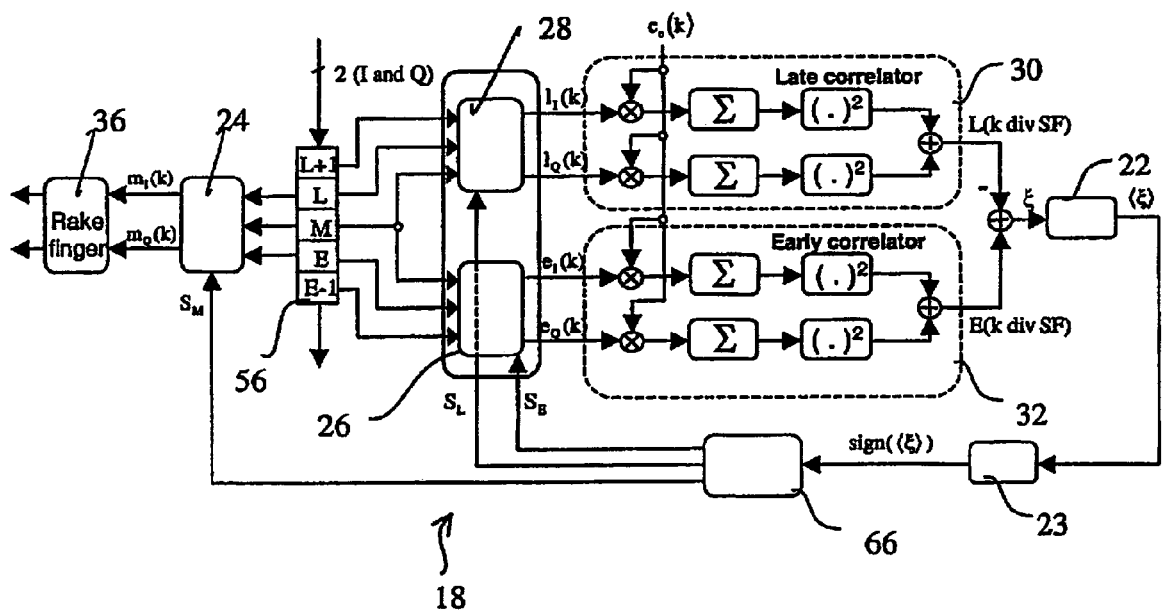
FIG. 10 is a complete block diagram of a digital Early-Late synchronizer with feedback loop, according to the invention.

A complete Early-Late synchronizer 18, which can be used in a digital communication receiver for maintaining fine alignment between an incoming spread spectrum signal and a locally generated code, is shown in FIG. 10.

The device 18 comprises:

- a delay line 56 for storing a plurality of consecutive samples E−1, E, M, L, L+1 of the incoming spread spectrum signal;
- a first digitally controlled interpolator 26 for determining by interpolation between consecutive samples an interpolated early sample (e) anticipating an optimal sampling time instant;
- a second digitally controlled interpolator 24 for determining by interpolation between consecutive samples an interpolated middle sample (m) corresponding to the optimal sampling time instant;
- a third digitally controlled interpolator 28 for determining by interpolation between consecutive samples an interpolated late sample (l) delayed with respect to said optimal sampling time instant;
- a first correlator 32 performing the despreading and integrate and dump operations on the interpolated early sample (e), and a second correlator 30 performing the same operations on the interpolated late sample (l); the outputs of the two correlators are squared in order to get the energy of the despreaded symbols and to remove the modulation of the data sequence and the phase rotation introduced by the propagation channel; finally, an error signal ξ is computed by taking the difference of the two-correlator outputs;
- a low pass filter 22 for averaging the error signal ξ on a certain number of symbols;
- a circuit 23 for extracting sign of the error signal ξ;
- a control signal generator 66 for accumulating the sign of the error signal ξ in an internal register, for the generation of control signals $S_E$, $S_M$, $S_L$ for controlling the interpolation phases of the first 26, second 24 and third 28 digitally controlled interpolators.

The time distance between the interpolated early (e) and late (l) samples varies in relation with the control signals $S_E$, $S_M$, $S_L$, as will be explained in detail below.

The early-late synchronizer 18 is a closed loop control system whose bandwidth is relatively narrow compared to the chip rate $F_C$. The low pass filter 22, used to average the error signal ξ on a certain number symbols, determines the loop bandwidth. In order to maintain a precise code synchronisation, the loop bandwidth must be large enough to track the instantaneous delay of the correlation function but sufficiently narrow to reject the effects of noise and interference.

The system therefore automatically minimizes the error signal by converging towards the error zero condition. The minimum error condition is equivalent to say that the middle sample is the one with the maximum energy and therefore the optimal one.

Figure 11:
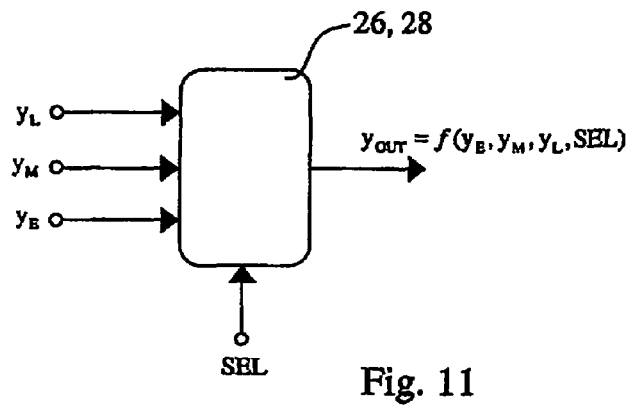
FIG. 11 is a digitally controlled interpolator used in the synchronizer of FIG. 10.

Each of the digitally controlled interpolators 24, 26, 28 is a device, as the one shown in FIG. 11, receiving three input signals, denoted as $y_E$, $y_M$, $y_L$ and a control signal denoted with SEL. The output of the interpolator $y_{OUT}$ is a function of the four inputs, $y_{OUT}=f(y_E, y_M, y_L, SEL)$.

The inputs $y_E$, $y_M$ and $y_L$ are fed with three consecutive samples of the digital signal y(t) to be interpolated (the samples stored in the delay line 56). The time position, or interpolation phase, of the interpolated sample can be selected through the control signal SEL, as will be explained later on in detail.

The middle sample is provided to the Rake finger for the further base-band processing and it has to be selected with sufficient precision in order not to reduce the performance of the receiver in terms of Bit Error Rate (BER).

According to the invention, the time resolution of the first 26 and third 28 digitally controlled interpolators is lower than the time resolution of the second digitally controlled interpolator 24.

In particular, assuming that the consecutive input samples E−1, E, M, L, L+1 are time spaced of $T_C/(2 \cdot n)$, where $T_C$ is the period of an elementary waveform and n=1, 2, 3 . . . is an integer, the time resolution used for determining by interpolation the interpolated early (e) and late (l) samples is $T_C/(4 \cdot n)$, while the time resolution used for determining the middle interpolated sample (m) is $T_C/(8 \cdot n)$.

In the embodiment shown in FIG. 10, as the input samples are time spaced of $T_C/2$, the early and late interpolators 26, 28 have a time resolution of $T_C/4$, while the middle interpolator 24 has a resolution of $T_C/8$.

Figure 12:
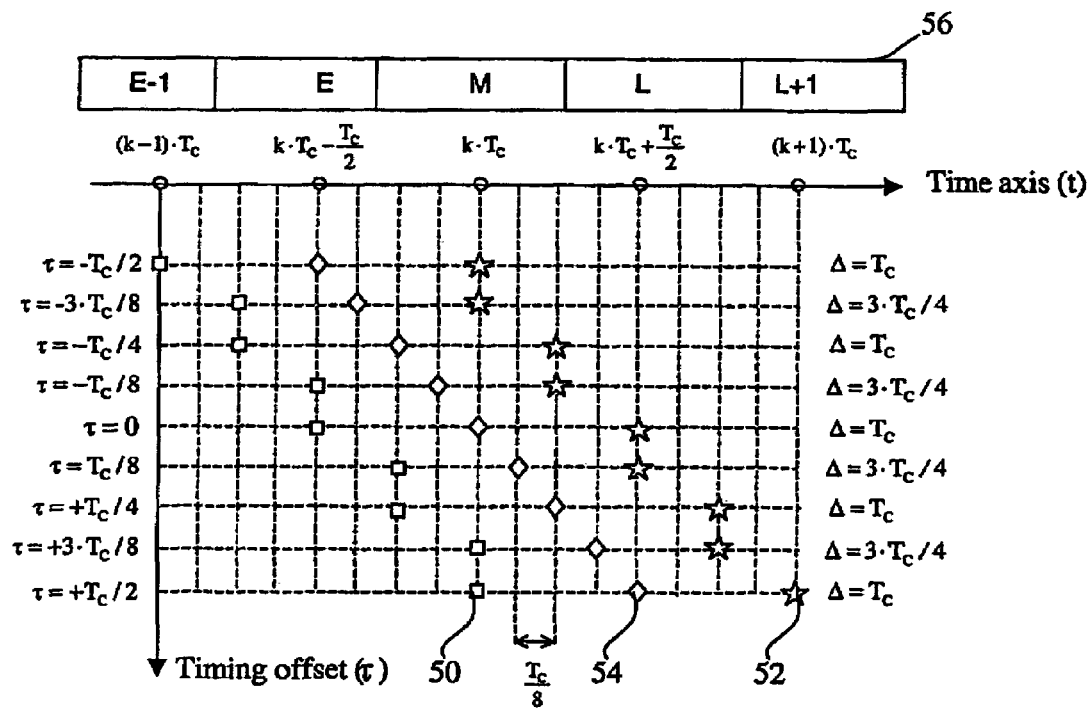
FIG. 12 is a diagram showing the Early-Late spacing as a function of timing error τ, according to the invention.

FIG. 12 illustrates five consecutive received signal samples 56 (E−1, E, M, L, L+1), time spaced of $T_C/2$ on a time axis t, and nine different interpolation patterns corresponding to nine different timing errors τ (from τ=−$T_C/2$ to τ=$T_C/2$). The interpolated early samples am shown in FIG. 12 by square symbols 50, the interpolated middle samples by diamond symbols 54 and the interpolated late samples by star symbols 52.

As can be seen in FIG. 12, the early-late spacing Δ is variable and take the two values $T_C$ or $3 \cdot T_C/4$, alternatively, as a function of timing error τ.

In particular the early-late spacing Δ is equal to $T_C$ when timing error τ is zero or an even multiple of $T_C/8$ (corresponding to an even value of control signal $S_M$):

$$\Delta = T_C \quad \text{when} \quad \tau = \pm 2 \cdot n \cdot \frac{T_C}{8} \quad n = 0, 1, 2, \ldots$$

and is equal to $3 \cdot T_C/4$ when timing error τ is an odd multiple of $T_C/8$ (corresponding to a odd value of control signal $S_M$):

$$\Delta = 3 \cdot T_C/4 \quad \text{when} \quad \tau = \pm(2 \cdot n + 1) \cdot \frac{T_C}{8} \quad n = 0, 1, 2, \ldots$$

The interpolated middle sample 54, computed with a resolution of $T_C/8$, is always taken as the midpoint between the early 50 and the late 52 samples in order to ensure the error signal balancing.

The output values $y_{OUT} = f(y_B, y_M, y_L, SEL)$ of the digitally controlled interpolator 24, having a time resolution of $T_C/8$ are listed in the table of FIG. 13.

The table of FIG. 14 illustrates the output values $y_{OUT} = f(y_E, y_M, y_L, SEL)$ of the digitally controlled interpolators 26, 28, having a time resolution $\delta = T_C/4$.

As it is shown in FIG. 14, the mathematical operations required to perform a linear interpolation with resolution $\delta = T_C/4$ are only sums and divisions by two (i.e. right shifts), therefore the hardware complexity of such linear interpolators is much lower than an interpolator with resolution $\delta = T_C/8$.

Figures 15, 16:
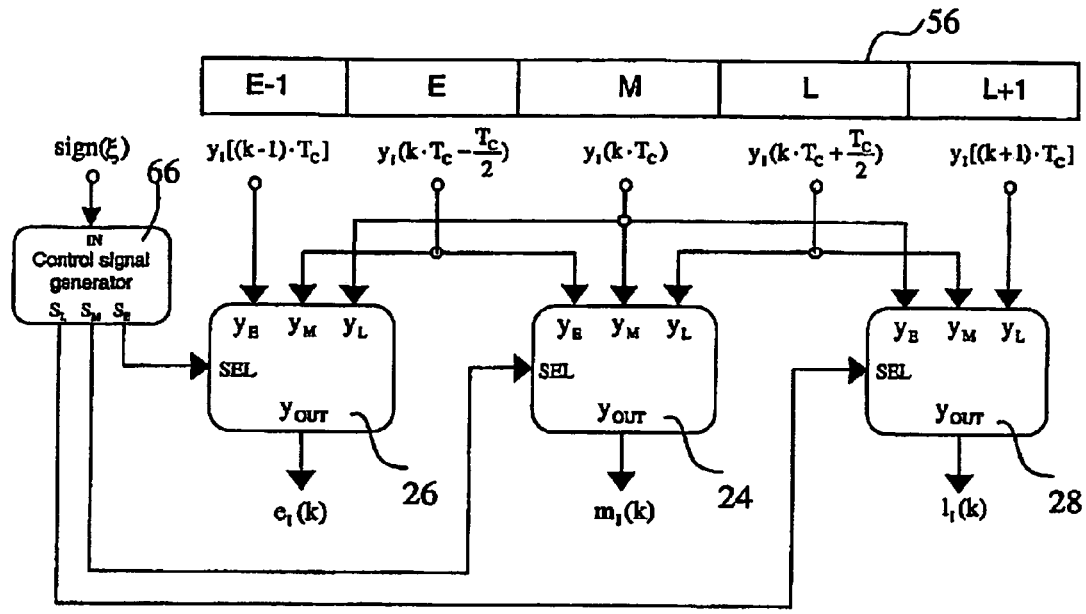
FIG. 15 is a block diagram of a complete structure of interpolators according to the invention.
FIG. 16 is a table illustrating the values of control signals of the interpolators of FIG. 15.

In FIG. 15 is illustrated the complete structure of the early-middle-late interpolators for one signal component. The structure has been shown for the in-phase component I of the signal, however the same structure is valid also for the in-phase Q component.

The block that generates the control signals for the interpolators is shown in FIG. 10 and FIG. 15 as block 66.

The control signal generator 66 receives, as input, the sign of the error signal ξ, computed according to the following rule $$\text{sign}(\xi) = \begin{cases} +1 & \text{if } \xi > 0 \\ 0 & \text{if } \xi = 0 \\ -1 & \text{if } \xi < 0 \end{cases}$$

and provides as output the control signals $S_E$, $S_M$ and $S_L$ for the three interpolators of the early, middle and late samples respectively. The control signals $S_E$, $S_M$ and $S_L$ generated by block 66 are the same for both the in-phase and in-quadrature component interpolators.

The control signal $S_M$ for the interpolator 24 working on the middle samples is obtained by accumulating the sign of the error signal, with a saturation for values larger than 4 or smaller than −4, in order to generate a control signal consistent with the table of FIG. 13. The algorithm employed for the generation of the signal $S_M$ is the following $S_M(-1)=0$ $S_M(n)=S_M(n-1)+\text{sign}(\xi)$ if$[S_M(n)>4]$ then $S_M(n)=4$ if$[S_M(n)<-4]$ then $S_m(n)=-4$ The values of the control signals $S_E$ and $S_L$ for the early and late interpolators respectively, can be derived as a function of the control signal $S_M$ from FIG. 11 and from the table of FIG. 14. In particular, the values of the control signals $S_E$, $S_L$ and $S_M$ as a function of the timing offset τ are given in the table of FIG. 16.

The expressions of the control signals $S_E$ and $S_L$ can be computed as a function of the signal $S_M$:

$$S_E = \left\lfloor \frac{S_M}{2} \right\rfloor \qquad S_L = \left\lfloor \frac{S_M + 1}{2} \right\rfloor$$

where the function $\lfloor \cdot \rfloor$ approximates the argument to the nearest lower integer.

A further reduction of the complexity can be obtained by using a single time multiplexed interpolator for the computation of the interpolated early sample and the interpolated late sample. The multiplexing is possible because, using a single correlator, the early and the late samples are computed at different time intervals: the early sample is computed during the first half of each DPCCH bit and the late during the second half.

The device previously described allows the fine synchronization of a digital telecommunication receiver by means of a method, for maintaining fine alignment between the incoming spread spectrum signal and a locally generated code, comprising the following steps:

storing a plurality of consecutive samples E−1, E, M, L, L+1 of the incoming spread spectrum signal in a delay line 56;

determining by interpolation between consecutive samples of the incoming spread spectrum signal, by means of a fiat digitally controlled interpolator 26, an interpolated early sample (e) anticipating an optimal sampling time instant;

determining by interpolation between consecutive samples of the incoming spread spectrum signal, by means of a second digitally controlled interpolator 24, an interpolated middle sample (m) corresponding to the optimal sampling time instant;

determining by interpolation between consecutive samples of the incoming spread spectrum signal, by means of a third digitally controlled interpolator 28, an interpolated late sample (l) delayed with respect to the optimal sampling time instant;

calculating an error signal ξ as the difference between the energy of the symbols computed from the interpolated early sample (e) and the interpolated late (l) sample;

extract the sign of the error signal ξ;

accumulating the sign of the ear signal ξ for the generation of control signals $S_E$, $S_M$, $S_L$ for determining the interpolation phases of the digitally controlled interpolators used for computing the interpolated early (e), middle (m) and late (l) samples. The accumulated value has a positive saturation value of +4 and a negative saturation value of −4.

The phases, or time position, of the early and late interpolators 26, 28 are controlled by the control signals $S_E$ and $S_L$ in such a way that the time distance between the interpolated early (e) and late (l) samples is made variable, as previously described with reference to FIG. 12.

In particular, the time distance between the interpolated early (e) and late (l) samples assumes, alternatively, a value of $T_C$, where $T_C$ is the period of an elementary waveform, when the first control signal ($S_M$) is an even value, or a value of $3 \cdot T_C/4$ when the first control signal ($S_M$) is an odd value.

Thanks to the variable spacing between the early and the late samples, the time resolution of the respective interpolators 26, 28 can be lower than the time resolution of the interpolator 24 used for determining the middle interpolated sample (m).

In the embodiment previously described the time resolution of interpolators 26, 28 is half than the time resolution of interpolator 24, in particular the time resolution of interpolators 26, 28 is $T_C/4$ and the time resolution of interpolator 24 is $T_C/8$.

In general the relation between the time resolution of interpolators is the following, supposing that the samples of the incoming spread spectrum signal are time spaced of $T_C/(2 \cdot n)$, where $T_C$ is the period of an elementary waveform and n is an integer:

$T_C/(4 \cdot n)$ is the time resolution of interpolators 26, 28;

$T_C/(8 \cdot n)$ is the time resolution of interpolators 24.

The time distance between the interpolated early (e) and late (l) samples assumes, alternatively, a value of $T_C$ or a value of $3 \cdot T_C/4$, depending on the values of control signals $S_E$ and $S_L$, according to the diagram of FIG. 12.

The invention claimed is:

1. A method for fine synchronization of a digital telecommunication receiver, comprising a code tracking process for maintaining fine alignment between an incoming spread spectrum signal and a locally generated code, said method comprising:

storing a plurality of consecutive samples (E−1, E, M, L, L+1) of said incoming spread spectrum signal in a delay line (56);

determining by interpolation between consecutive samples of said incoming spread spectrum signal, by means of a first (26) digitally controlled interpolator, an interpolated early sample (e) anticipating an optimal sampling time instant;

determining by interpolation between consecutive samples of said incoming spread spectrum signal, by means of a second (24) digitally controlled interpolator, an interpolated middle sample (m) corresponding to said optimal sampling time instant;

determining by interpolation between consecutive samples of said incoming spread spectrum signal, by means of a third (28) digitally controlled interpolator, an interpolated late sample (l) delayed with respect to said optimal sampling time instant;

calculating an error signal (ξ) as the difference between the energy of the symbols computed from said interpolated early (e) and late (l) samples;

characterised in that said method further comprises the following steps:

extracting the sign of said error signal (ξ);

accumulating said sign of said error signal (ξ) for the generation of control signals ($S_E$, $S_M$, $S_L$) for controlling the interpolation phases of said digitally controlled interpolators; wherein the time distance between said interpolated early (e) and late (l) samples varies in relation with a first of said control signal ($S_M$), and the time resolution used for determining by interpolation said interpolated early (e) and late (l) samples is lower than the time resolution used for determining by interpolation said middle interpolated sample (m).

2. A method according to claim 1, wherein said stop of accumulating said sign of said error signal (ξ) provides that the value accumulated has a positive saturation value of +4 and a negative saturation value of −4.

3. A method according to claim 1 or 2, wherein the time distance between said interpolated early (e) and late (l) samples assumes, alternatively, a value of $T_C$, where $T_C$ is the period of an elementary waveform, when said first control signal ($S_M$) is an even value, or a value of $3 \cdot T_C/4$ when said first control signal ($S_M$) is an odd value.

4. A method according to claim 2, wherein a second control signal ($S_E$), for controlling said first digitally controlled interpolator (26), is generated as a function of said first control signal ($S_M$), according to the formula:

$$S_E = \left\lfloor \frac{S_M}{2} \right\rfloor$$

where the function $\lfloor \cdot \rfloor$ approximates the argument to the nearest lower integer.

5. A method according to claim 2, wherein a third control signal ($S_L$), for controlling said third digitally controlled interpolator (28), is generated as a function of said first control signal ($S_M$), according to the formula:

$$S_L = \left\lfloor \frac{S_M + 1}{2} \right\rfloor$$

where the function $\lfloor \cdot \rfloor$ approximates the argument to the nearest lower integer.

6. A method according to claim 1, wherein the time resolution used for determining by interpolation said interpolated early (e) and late (l) samples is half than the time resolution used for determining by interpolation said middle interpolated sample (m).

7. A method according to claim 6, wherein said plurality of consecutive samples (E−1, E, M, L, L+1) are time spaced of $T_C/(2 \cdot n)$, where $T_C$ is the period of an elementary waveform and n is an integer, the time resolution used for determining by interpolation said interpolated early (e) and late (l) samples is $T_C/(4 \cdot n)$ and the time resolution used for determining by interpolation said middle interpolated sample (m) is $T_C/(8 \cdot n)$.

8. A method according to claim 6, wherein said plurality of consecutive samples (E−1, E, M, L, L+1) are time spaced of $T_C/2$, where $T_C$ is the period of an elementary waveform, the time resolution used for determining by interpolation said interpolated early (e) and late (l) samples is $T_C/4$ and the time resolution used for determining by interpolation said middle interpolated sample (m) is $T_C/8$.

9. A digital communication receiver comprising a device for maintaining fine alignment between an incoming spread spectrum signal and a locally generated code, said device comprising:
a delay line (56) for storing a plurality of consecutive samples (E−1, E, M, L, L+1) of said incoming spread spectrum signal;
a first digitally controlled interpolator (26) for determining by interpolation between consecutive samples stored in said delay line (56) an interpolated early sample (e) anticipating an optimal sampling time instant;
a second digitally controlled interpolator (24) for determining by interpolation between consecutive samples stored in said delay line (56) an interpolated middle sample (m) corresponding to said optimal sampling time instant;
a third digitally controlled interpolator (28) for determining by interpolation between consecutive samples stored in said delay line (56) an interpolated late sample (l) delayed with respect to said optimal sampling time instant;
at least a correlator (30, 32, 22) for calculating an error signal (ξ) as the difference between the energy of the symbols computed from said interpolated early (e) and late (l) samples;
characterised in that said device further comprises:
a circuit (23) for extracting the sign of said error signal (ξ);
a control signal generator (66) for accumulating said sign of said error signal (ξ) in a register for the generation of control signals ($S_E$, $S_M$, $S_L$) for controlling the interpolation phases of said first (26), second (24) and third (28) digitally controlled interpolators;
wherein the time distance between said interpolated early (e) and late (l) samples varies in relation with a first of said control signals ($S_M$), and the time resolution of said first (26) and third (28) digitally controlled interpolators is lower than the time resolution of said second (24) digitally controlled interpolator.

10. A digital communication receiver according to claim 9, wherein said register in which is accumulated the sign of said error signal has a positive saturation value of +4 and a negative saturation value of −4.

11. A digital communication receiver according to claim 9 or 10, wherein the time distance between said interpolated early (e) and late (l) samples assumes, alternatively, a value of $T_C$, where $T_C$ is the period of an elementary waveform, when said first control signal ($S_M$) is an even value, or a value of $3 \cdot T_C/4$ when said first control signal ($S_M$) is an odd value.

12. A digital communication receiver according to claim 10, wherein a second control signal ($S_E$), for controlling said first digitally controlled interpolator (26), is generated as a function of said first control signal ($S_M$), according to the formula:

$$S_E = \left\lfloor \frac{S_M}{2} \right\rfloor$$

where the function $\lfloor \cdot \rfloor$ approximates the argument to the nearest lower integer.

13. A digital communication receiver according to claim 10, wherein a third control signal ($S_L$), for controlling said third digitally controlled interpolator (28), is generated as a function of said first control signal ($S_M$), according to the formula:

$$S_L = \left\lfloor \frac{S_M + 1}{2} \right\rfloor$$

where the function $\lfloor \cdot \rfloor$ approximates the argument to the nearest lower integer.

14. A digital communication receiver according to claim 9, wherein the time resolution used for determining by interpolation said interpolated early (e) and late (l) samples is half than the time resolution used for determining by interpolation said middle interpolated sample (m).

15. A digital communication receiver according to claim 14, wherein said plurality of consecutive samples (E−1, E, M, L, L+1) are time spaced of $T_C/(2 \cdot n)$, where $T_C$ is the period of an elementary waveform and n is an integer, the time resolution used for determining by interpolation said interpolated early (e) and late (l) samples is $T_C/(4 \cdot n)$ and the time resolution used for determining by interpolation said middle interpolated sample (m) is $T_C/(8 \cdot n)$.

16. A digital communication receiver according to claim 14, wherein said plurality of consecutive samples (E−1, E, M, L, L+1) are time spaced of $T_C/2$, where $T_C$ is the period of an elementary waveform, the time resolution used for determining by interpolation said interpolated early (e) and late (l) samples is $T_C/4$ and the time resolution used for determining by interpolation said middle interpolated sample (m) is $T_C/8$.

17. A digital communication receiver according to claim 9 or 10, wherein said delay line (56) stores five consecutive samples (E−1, E, M, L, L+1) of said incoming spread spectrum signal.

18. A digital communication receiver according to claim 17, wherein said first digitally controlled interpolator (26), which is controlled by said second ($S_E$) control signal, receives in input the first three samples (E−1, E, M) stored in said delay line (56), and generates said interpolated early sample (e) as a function of said second control signal ($S_E$) and said first three samples (E−1, E, M).

19. A digital communication receiver according to claim 17, wherein said second digitally controlled interpolator (24), which is controlled by said first ($S_M$) control signal, receives in input the three middle samples (E, M, L) stored in said delay line (56) and generates said interpolated middle sample (m) as a function of said first control signal ($S_M$) and said three middle samples (E, M, L).

20. A digital communication receiver according to claim 17, wherein said third digitally controlled interpolator (28), which is controlled by said third ($S_L$) control signal, receives in input the last three samples (M, L, L+1) stored in said delay line (56) and generates said interpolated late sample (l) as a function of said third control signal ($S_L$) and said last three samples (M, L, L+1).

21. A digital communication receiver according to claim 9, wherein said first digitally controlled interpolator (26) and said third digitally controlled interpolator (28) are realized as a single time multiplexed digitally controlled interpolator, the interpolated early (e) and the interpolated late (l) samples being computed at different time intervals.

* * * * *